United States Patent
Nowell et al.

[15] 3,697,853
[45] Oct. 10, 1972

[54] PULSE GENERATOR FOR USE WITH A SWITCHING REGULATOR

[72] Inventors: John R. Nowell, Phoenix; Luther L. Genuit, Scottsdale, both of Ariz.

[73] Assignee: Honeywell Information Systems Inc., Waltham, Mass.

[22] Filed: Dec. 22, 1971

[21] Appl. No.: 214,500

[52] U.S. Cl..................321/2, 307/252 K, 321/11, 321/12, 321/18
[51] Int. Cl.......H02m 1/08, H02m 1/18, H02m 3/32
[58] Field of Search........321/2, 11, 12, 13, 18, 45 R; 307/252 J, 252 K, 252 L

[56] References Cited

UNITED STATES PATENTS

| | | | |
|---|---|---|---|
| 3,119,058 | 1/1964 | Genuit | 307/252 K |
| 3,439,252 | 4/1969 | Sikes et al. | 321/11 |
| 3,490,028 | 1/1970 | Modiano | 321/2 |
| 3,526,823 | 9/1970 | Genuit | 321/2 |

Primary Examiner—William H. Beha, Jr.
Attorney—Lloyd B. Guernsey et al.

[57] ABSTRACT

A rate generator and a recovery disable circuit receive an input current and deliver pulses having a frequency which is proportional to the value of the current received. The recovery disable circuit prevents the rate generator from delivering pulses during the time the silicon controlled rectifiers and output diodes of the switching regulator are conducting. The rate generator includes an oscillator which develops pulses and a pulse amplifier which amplifies the pulses and prevent noise signals from decreasing the width of the pulses.

9 Claims, 4 Drawing Figures

INVENTORS
JOHN R. NOWELL
LUTHER L. GENUIT
By Lloyd B. Guernsey
AGENT

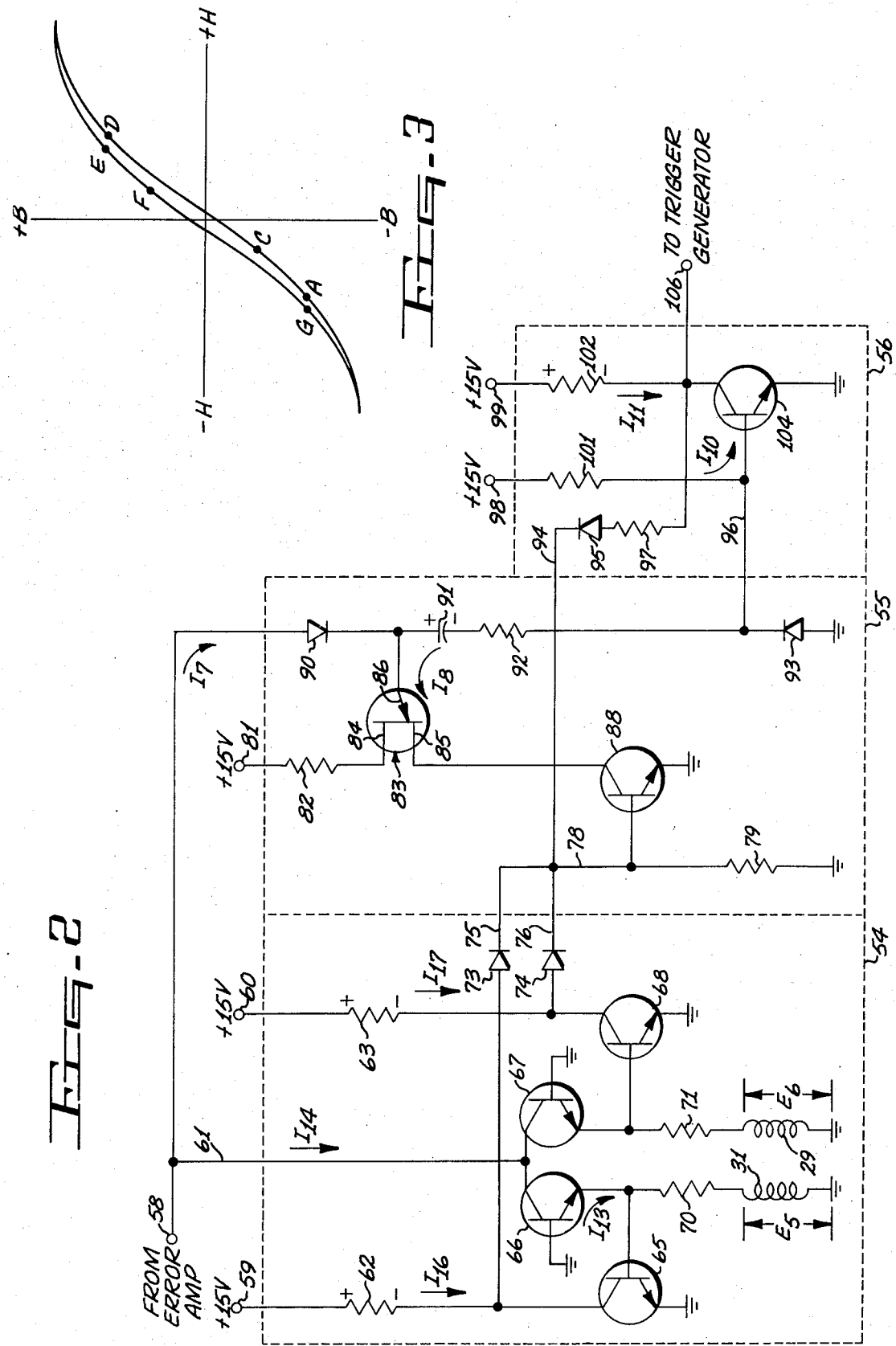

PULSE GENERATOR FOR USE WITH A SWITCHING REGULATOR

CROSS REFERENCE TO RELATED APPLICATIONS

A detailed description of the operation of the error amplifier can be found in the U.S. patent application by John R. Nowell filed November 22, 1971, entitled "Error Amplifier for Use with a Switching Regulator". A more detailed description of the operation of the switching regulator can be found in the U.S. Pat. No. 3,573,597 by Luther L. Genuit and John R. Nowell, issued April 6, 1971, entitled "High Current Switching Regulator with Overlapping Output Current Pulses".

BACKGROUND OF THE INVENTION

This invention relates to a pulse generator for use with a switching regulator and more particularly to a pulse generator which uses a rate generator, a recovery disable circuit and a pulse amplifier to receive an input current and to deliver pulses having a frequency which is proportioned to the value of the current received. The recovery disable circuit prevents the rate generator from delivering pulses during the time that the silicon controlled rectifiers and the output diodes of the switching regulator are conducting. The pulse amplifier increases the amplitude of the pulses and also prevents noise signals from decreasing the width of the pulses generated.

In high speed data processing systems switching regulators may be used to provide D.C. power to electronic circuits in the system. These regulators are smaller and more efficient than prior art power supplies so that the regulators may be located in the cabinets which contain the circuits rather than in a separate cabinet as required when prior art power supplies are used. Location of regulators near the circuits greatly reduces the length of cables which distribute the current to the circuits and reduces the amount of error signals which may be caused by variation in voltage in long cables.

The switching regulator may employ a pair of transformers, a pair of silicon controlled rectifiers and a source of signals to convert an unregulated D.C. voltage, such as 150 volts, to an accurately regulated voltage, such as one volt. The silicon controlled rectifiers are employed as switches between the source of unregulated D.C. voltage and the transformers. The silicon controlled rectifiers are located on the "high" voltage side of the transformers where the current and power losses in these rectifiers are low, thereby causing the switching regulator to have a high degree of efficiency. The regulated D.C. voltage obtained from the secondary windings on the transformers is supplied to a pair of voltage output terminals. The transformers provide isolation between the regulated D.C. voltage and the source of unregulated D.C. voltage so that a short circuit in a silicon controlled rectifier will not cause damage to the microcircuit modules which provide the load on the switching regulator.

The silicon controlled rectifier is a semi-conductor device having an anode, a cathode and a gate. The silicon controlled rectifier can be used as an ON-OFF switch which can be turned on in a very few microseconds. Normally, the silicon controlled rectifier cannot conduct current between anode and cathode thereof until a pulse of current larger than a threshold value flows from gate to cathode. If a positive voltage difference exists between the anode and the cathode when a pulse of current flows into the gate, the silicon controlled rectifier "fires"; i.e., is rendered conductive and a current will flow from the anode to the cathode. The rate at which the current flow from anode to cathode increases when the silicon controlled rectifier fires must be limited to prevent damage to the rectifier. Once anode-cathode flow commences, the gate has no further control over such current flow. Current flow from anode to cathode in a rectifier can be terminated only by reducing the anode to cathode current below a "holding" or minimum current value. A more detailed description of the operation of a silicon controlled rectifier can be found in the "Silicon Controlled Rectifier Manual", 4th edition, 1967, published by the General Electric Company, Syracuse New York.

A signal source is coupled to the voltage output terminals and develops trigger signals whose frequency is determined by the value of voltage at the voltage output terminal. The trigger signals are coupled to the silicon controlled rectifiers in the switching regulator and cause these rectifiers to deliver energy through the transformers to output filter capacitors which are connected to the voltage output terminal. The signal source senses any change in the value of regulated output voltage and causes a change in the frequency of the trigger signals delivered to the switching regulator.

The signal source includes an error amplifier, a rate generator and a trigger generator. The error amplifier develops a current having a value which is determined by the voltage at the output terminals of the switching regulator. This current is applied to the rate generator which develops pulses having a frequency which is determined by the value of the current from the error amplifier. The pulses from the rate generator are applied to the trigger generator which develops trigger signals which are applied to the gates of the silicon controlled rectifiers in the switching regulator.

Prior art rate generators include an oscillator and a circuit which disables the oscillator during the time that all of the secondary winding of the transformers in the switching regulator are delivering current to the output filter capacitors. If the oscillator were to deliver a pulse to the switching regulator while all of the secondary windings are delivering current to the filter capacitor current in one of the silicon controlled rectifiers could increase very rapidly and cause damage to the rectifier. Prior art rate generators use a unijunction transistor and a capacitor-resistor charging circuit. The capacitor charges through a resistor to a predetermined value of voltage, then discharges through the unijunction transistor to provide a pulse. If the capacitor charges while one of the silicon controlled rectifiers is conducting the oscillator could develop a pulse which could render the other rectifier conductive at the same time. If both rectifiers are conductive at the same time current through the rectifiers could become large enough to cause damage to the rectifiers. What is needed is a circuit which prevents the capacitor from charging while one of the rectifiers is conducting and thus inhibits the generation of pulses while the rectifier is conducting.

The present invention provides a pulse generator having a rate generator and a recovery disable circuit. The recovery disable circuit prevents the generation of pulses while any of the silicon controlled rectifiers in the switching regulator are conducting. The circuit also prevents developing a pulse for a rectifier while the transformer which is connected to the rectifier is delivering current to the filter capacitors.

It is, therefore, an object of this invention to provide a pulse generator having a circuit which inhibits the generation of pulses while all of the secondary windings of the switching regulator are delivering current to the output filter capacitors.

A further object of this invention is to provide a pulse generator having a circuit which inhibits the generation of pulses while any of the silicon controlled rectifiers in the regulator are conducting.

A still further object of this invention is to provide a pulse generator having a circuit which inhibits the generation of pulses while all of the secondary windings of the switching regulator are delivering current to the output filter capacitors, but is ready to produce a pulse as soon as one of the transformer windings stops the delivery of current.

Still another object of this invention is to provide a generator which develops pulses having a frequency which is determined by the value of a signal current which is applied to the generator.

SUMMARY OF THE INVENTION

The foregoing objects are achieved in the present invention by providing a new and improved pulse generator for use with a switching regulator. The pulse generator includes a rate generator and a recovery disable circuit. The rate generator includes an oscillator using a unijunction transistor and a pulse amplifier. The unijunction oscillator receives an input current and delivers pulses having a frequency which is proportional to the value of the current received. The recovery disable circuit prevents the oscillator from developing pulses while any one of the silicon controlled rectifiers in the switching regulator is conducting. The disable circuit also prevents the oscillator from developing a pulse for a rectifier while the transformer which is connected to the rectifier is delivering current to the filter capacitors in the switching regulator.

Other objects and advantages of this invention will become apparent from the following description when taken in connection with the accompanying drawings.

BRIEF DESCRIPTION OF THE DRAWINGS

FIG. 2 is a schematic drawing of an embodiment of the present invention;

FIG. 3 illustrates a magnetization curve which is useful in explaining the operation of the circuits shown in FIG. 1.

DESCRIPTION OF THE PREFERRED EMBODIMENT

Figure 1:
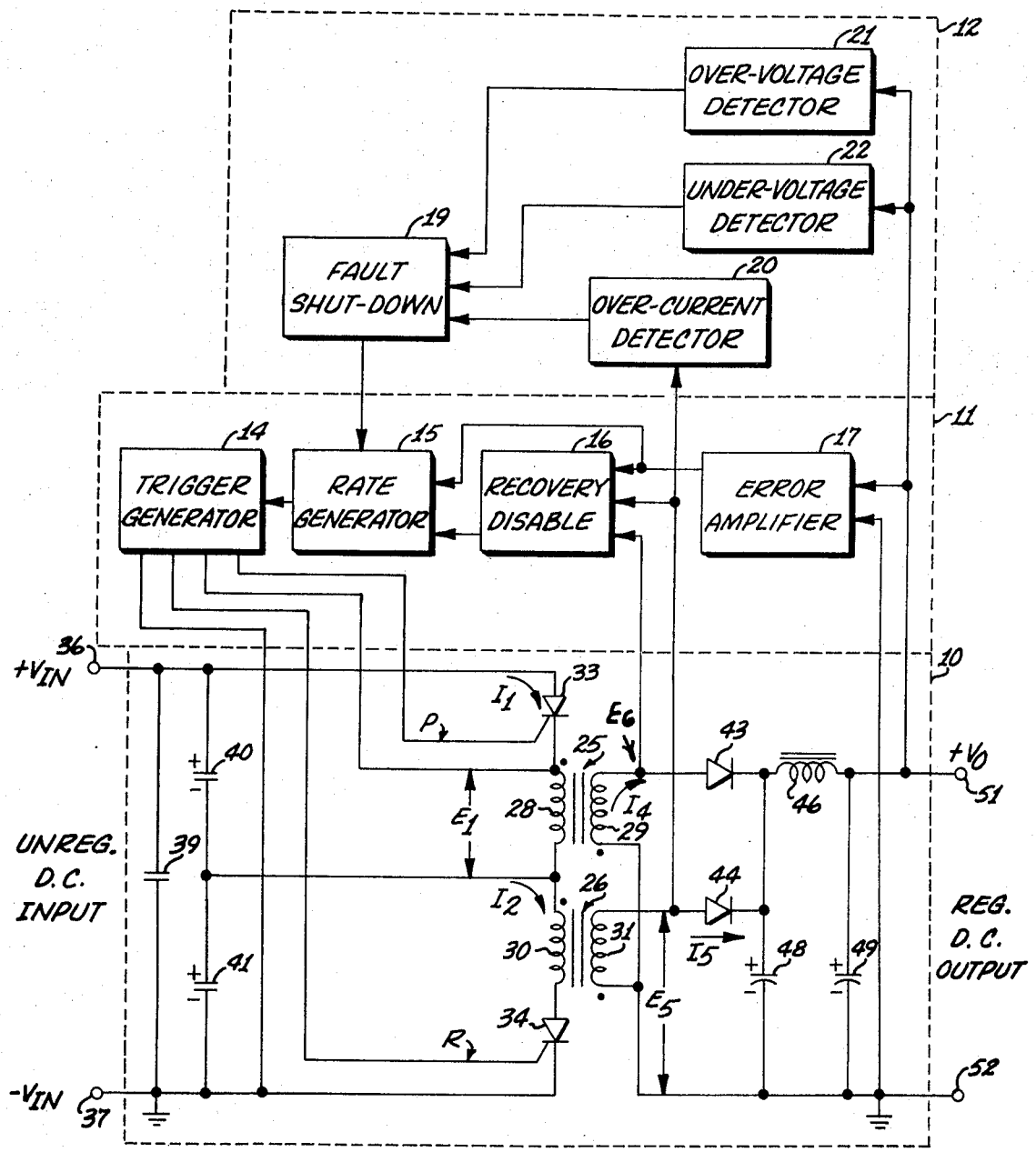
FIG. 1 is a schematic drawing of a switching regulator and its associated control circuits including the present invention.

Referring more particularly to the drawings by the characters of reference, FIG. 1 discloses a power supply system which is designed to provide a constant supply of D.C. output voltage for a wide range of values of output current and for monitoring the current delivered to a load which may be connected to the system. As indicated in FIG. 1, the system comprises a switching regulator 10, a switching regulator control circuit 11 for providing trigger signals to switching regulator 10, and a circuit 12 for monitoring the current and the voltage delivered by the power supply. The switching regulator control circuit 11 comprises a trigger generator 14, a rate generator 15, a recovery disable circuit 16 and an error amplifier 17. The error amplifier 17 detects any change in voltage at the output terminals of the switching regulator and provides a signal whose value is determined by the change in the output voltage. The signal from the error amplifier 17 causes the rate generator 15 to develop pulses having a frequency which is determined by the value of the signal from the amplifier 17. Pulses from the rate generator cause the trigger generator 14 to develop trigger pulses for the switching regulator. The recovery disable circuit 15 senses the time that output current is being delivered by the switching regulator to the output filter capacitors and prevents the rate generator from delivering pulses during the time that the current is being delivered.

The over-current detector 20, the over-voltage detector 21 and the under-voltage detector 22 sense any abnormal values of current or voltage at the output of the switching regulator and provide signals to the fault shutdown circuit 19. When the fault shutdown circuit 19 receives a signal from any of the detectors 20, 21 and 22 it provides a signal to the rate generator which disables the rate generator and prevents any pulses from being supplied to trigger the switching regulator.

SWITCHING REGULATOR

As indicated in FIG. 1, switching regulator 11 includes a pair of transformers 25 and 26, each having a primary winding and a secondary winding. The primary windings 28 and 30 are connected in series and are coupled to the high voltage unregulated D.C. power supply having a positive output terminal 36 and a negative output terminal 37. A pair of silicon controlled rectifiers 33 and 34 control the current supplied by the power supply to the primary windings of transformers 25 and 26. The anode of silicon controlled rectifier 33 is connected to the positive terminal 36 of the unregulated D.C. power supply and the cathode of silicon controlled rectifier 33 is connected to the upper end of primary winding 28. The gate of silicon controlled rectifier 33 is connected to one lead of the trigger generator 14 which provides trigger signals to render rectifier 33 conductive. The anode of silicon controlled rectifier 34 is connected to the lower end of primary winding 30 and the cathode of silicon controlled rectifier 34 is connected to the negative terminal of the unregulated D.C. power supply. A second lead from the trigger generator 14 is connected to the gate of silicon controlled rectifier 34 to provide trigger signals to render rectifier 34 conductive.

The magnetic core employed in transformers 25 and 26 produces the magnetization characteristics illustrated in the magnetization curve of FIG. 3. The magnetizing force H is equal to the product of the number of turns in a winding on the transformer core and the number of amperes of current for each turn of wire divided by the length of the core. Since the physical length of the particular transformer core is constant the magnetizing force of the transformer is often expressed as the number of amperes times the number of turns, or "ampere - turns". The flux density B is the number of lines of flux per square centimeter of the transformer core and is determined by the value of the magnetizing force and the type of material used in the core. A discussion of the magnetization curves can be found in the text book "Magnetic Circuits and Transformers" by E.E. Staff, M.I.T., 1943, published by John Wiley & Sons, New York, New York.

Figure 4:
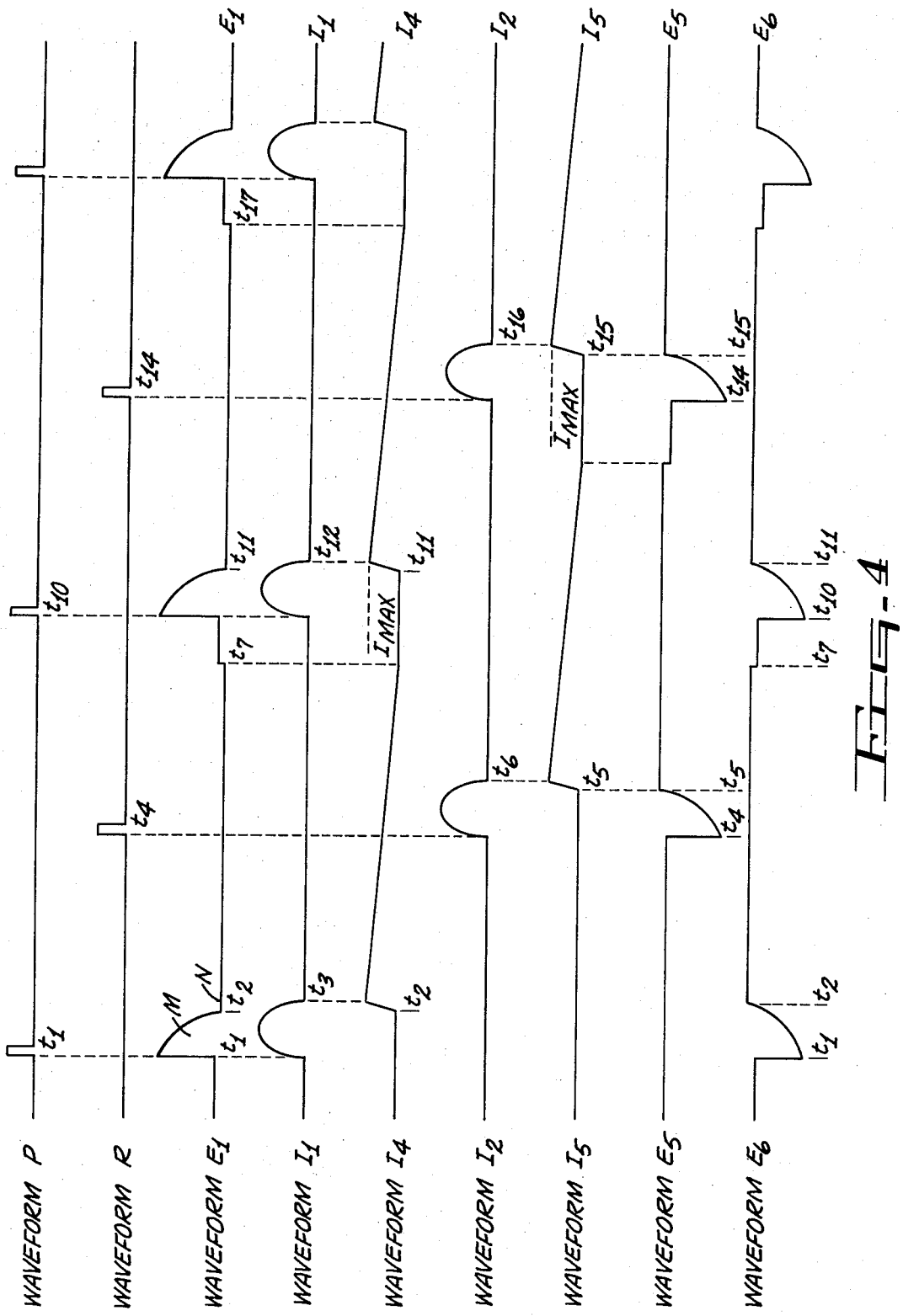
FIG. 4 illustrates waveforms which are useful in explaining the present invention.

The operation of the circuit of FIG. 1 will now be discussed in connection with the magnetization curve shown in FIG. 3 and the waveforms shown in FIG. 4.

A pair of capacitors 40 and 41 provide predetermined quantities of electrical energy to the transformers 25 and 26 each time one of the silicon controlled rectifiers 33 and 34 is rendered conductive. Each time one of the silicon controlled rectifiers 33 and 34 is rendered non-conductive the same predetermined quantity of energy is delivered by one of the transformers 25 and 26 through diodes 43 and 44 to a filter capacitor 48. Prior to the time $t_1$ shown in FIG. 4, capacitor 40 of FIG. 1 is charged to the polarity shown in FIG. 1. At time $t_1$ a pulse from trigger generator 14 renders silicon controlled rectifier 33 conductive so that the voltage across the capacitor 40 is supplied to the primary winding 28 of transformer 25 causing a current $I_1$ to flow from the upper plate of capacitor 40 through to anode to cathode of rectifier 33, through the primary winding 28 to the lower plate of capacitor 40. The current $I_1$ through primary winding 28 causes a change of flux in the transformer core and causes the operating point to move from point A toward point C of the magnetization curve in FIG. 3. This change in flux produces a voltage across primary winding 28, which limits the rate of increase in current through silicon controlled rectifier 33, thus preventing possible damage to rectifier 33. A positive voltage applied to the upper end of primary winding 28 causes the operating point to move upward from point C toward point D. The distance between point C and point D is proportional to the product of the voltage applied to primary winding 28 and the duration of time this voltage is applied.

The voltage applied to the primary winding 28 is magnetically coupled through the transformer core to the secondary winding 29. Between time $t_1$ and time $t_2$ secondary winding 29 has a positive polarity of voltage at the lower end of the winding and a negative polarity of voltage at the upper end of the winding. At this time, the voltage across the secondary winding 29 causes diode 43 to be back biased so that no current flows through the diode or through the secondary winding 28. Capacitor 40 provides current $I_1$ until this capacitor has discharged at time $t_2$ as shown in waveform $I_1$ of FIG. 4. The area M under the curve of waveform $E_1$ (FIG. 4) between time $t_1$ and $t_2$ is the sum of the products of and the energy which is transferred to the secondary winding 29 when silicon controlled rectifier 33 is rendered nonconductive, is proportional to the difference between the flux at point E and point G.

Since the distance between point A through point C to point D shown in FIG. 3 is substantially the same as the distance between point E through point F to point G, substantially all of the energy which was stored in the core of the transformer between times $t_1$ and $t_2$ is returned and is stored in capacitors 48 and 49. Capacitor 40 delivers substantially the same amount of energy to the transformer each time the silicon controlled rectifier 33 is rendered conductive so that the amount of energy delivered to filter capacitors 48 and 49 and the voltage across these capacitors is determined by the frequency of the signals applied to the gate of rectifier 33. Capacitor 41 also provides a predetermined quantity of energy to the transformer 26 each time silicon controlled rectifier 34 is rendered conductive.

Prior to time $t_4$, capacitor 41 is charged to the polarity shown in FIG. 1. At time $t_4$ a pulse from the trigger generator 14 renders silicon controlled rectifier 34 conductive so that current $I_2$ flows from the upper plate of capacitor 41 through the primary winding 30, from anode to cathode of rectifier 34 to the lower plate of capacitor 41. Current $I_2$ through the primary winding and the voltages impressed across this winding cause the operating point of the characteristic curve in FIG. 3 to move from point A through point C to point D and causing a predetermined quantity of energy to be stored in the core of transformer 26. When silicon controlled rectifier 34 is rendered nonconductive, this energy is transferred through the secondary winding 31 causing a current $I_5$ to charge capacitor 48 as described above.

The amount of voltage across the capacitors 48 and 49 can be controlled by controlling the frequency of the trigger signals which trigger generator 14 applies to the gates of silicon controlled rectifiers 33 and 34. The frequency of the trigger signals is determined by the value of the current applied to the rate generator 15. When an increase in the amount of current drawn by a load (not shown) connected across the output terminals 51 and 52 in FIG. 1 causes the value of the output voltage to fall below a predetermined reference level, the frequency of the signals from trigger generator 14 increases. This increase in the frequency of the output signals causes an increase in the rate of energy delivered to filter capacitors 48 and 49 and increases the voltage at the output terminals 51 and 52 to the predetermined reference level. The voltage at the output terminal 51 of the power supply controls the frequency of the signal from the trigger generator 14 so that the voltage at the output terminals 51 and 52 is substantially constant even when the current drawn from this power supply varies over a wide range of value.

Pulse Generator

As indicated in FIG. 2, the pulse generator comprises a recovery disable circuit 54 and a rate generator which includes an oscillator 55 and a pulse amplifier 56. The oscillator 55 generates a series of pulses having a frequency which is determined by the value of current supplied from the error amplifier to the signal-input terminal 58. These pulses are amplified by the pulse amplifier 56 and applied to the signal-output terminal 106 which is coupled to the trigger generator shown in FIG. 1. The oscillator 55 includes a unijunction transistor 83, a transistor 88 and a timing capacitor 91. A unijunction transistor is a semiconductor device having a first base or "base-one", a second base or "base-two" and an emitter. If a positive voltage difference exists between base-two and base-one, the unijunction transistor can conduct current between the emitter and base-one only when a voltage greater than the predetermined threshold or "peak point voltage" value exists between the emitter and base-one. When the voltage on the emitter is more than the peak point voltage, current flows from emitter to base-one until the emitter voltage decreases below a second predetermined or "valley" voltage value. A more detailed description of a unijunction transistor can be found in chapter 13 of the Transistor Manual, 7th edition, 1964, published by the General Electric Company, Syracuse, New York.

A positive voltage such as the +15 volts is applied to terminal 81 and coupled through resistor 82 to base-two of the unijunction transistor. Base-one is connected to the collector of transistor 88. A current from the error amplifier is applied to signal-input terminal 58. The current from the error amplifier causes a current $I_7$ to flow from terminal 58 through diode 90 to the upper plate of capacitor 91, from the lower plate of capacitor 91 through resistor 92, from the base to emitter of transistor 104 in the pulse amplifier. Current $I_7$ produces a charge of the polarity shown on capacitor 91. Transistor 88 provides a discharge path for the capacitor 91 when transistor 88 is conductive and prevents discharge of the capacitor when the transistor is non-conductive. When a positive voltage is applied to the base of transistor 88, transistor 88 is rendered conductive.

When unijunction transistor 83 is not conducting the voltage at the base of transistor 104 in pulse amplifier 56 is positive due to the +15 volts on terminal 98. The positive voltage on terminal 98 causes a current $I_{10}$ to flow from terminal 98 through resistor 101, from base to emitter of transistor 104 thereby rendering transistor 104 conductive. When transistor 104 is conductive a current $I_{11}$ flows from terminal 99 through resistor 102, from collector to emitter of transistor 104. Current $I_{11}$ through resistor 102 provides a voltage drop of the polarity shown in FIG. 2. The voltage drop across resistor 102 subtracts from the +15 volts at terminal 99 so that the voltage at signal-output terminal 106 is near ground potential.

Current $I_7$ causes the voltage across capacitor 91 to increase until the voltage at the emitter of unijunction transistor 83 is greater than the peak point voltage. If transistor 88 is conductive the voltage at the emitter of unijunction transistor 83 causes a current $I_8$ to flow from the upper plate of capacitor 91 through emitter to base-one of transistor 83, from collector to emitter of transistor 88 to ground, from ground through diode 93, and resistor 92 to the lower plate of capacitor 91 thereby discharging capacitor 91. Current $I_8$ through diode 93 develops a negative voltage at the cathode of diode 93 so that a negative voltage is applied to the base of transistor 104 thereby rendering transistor 104 nonconductive. When transistor 104 is rendered nonconductive the voltage drop across resistor 102 decreases so that a positive pulse of voltage is developed at the signal-output terminal 106.

When either of the silicon controlled rectifiers shown in FIG. 1 is conducting the recovery disable circuit 54 provides a low impedance between the signal-input terminal 58 and ground so that the capacitor 91 in the rate generator is unable to charge. When silicon controlled rectifier 33 is conducting a negative voltage is developed across the secondary winding 29 of transformer 25 as shown in waveform $E_6$ of FIG. 4. When silicon controlled rectifier 34 is conducting a negative voltage is developed across the secondary winding 31 as shown in waveform $E_5$. Resistors 70 and 71 of FIG. 2 are connected to the secondary windings 31 and 29 respectively of the transformers shown in FIG. 1.

When silicon controlled rectifier 34 of FIG. 1 is rendered conductive the negative voltage at the upper end of winding 31 (FIG. 2) causes a current $I_{13}$ to flow from the base to emitter of transistor 66, through resistor 70 and secondary winding 31 to ground. Current $I_{13}$ renders transistor 66 conductive. When transistor 66 is rendered conductive the impedance between collector and ground is very low so that the collector of transistor 66 is substantially at ground potential. The ground potential at the collector of transistor 66 and at the signal-input terminal 58 prevents current from flowing through diode 90 to charge capacitor 91 in the rate generator 55. The current applied to input terminal 58 flows from terminal 58 through collector to emitter of transistor 66, through resistor 70 and winding 31 to ground. When silicon controlled rectifier 33 of FIG. 1 is rendered conductive the voltage across secondary winding 29 causes transistor 67 (FIG. 2) to be conductive so there is a low impedance between the collector of transistor 67 and ground. This low impedance also prevents capacitor 91 from charging. Thus, when either transistor 66 or 67 in the recovery disable circuit is rendered conductive capacitor 91 in the rate generator does not charge.

It is also important that the rate generator not develop pulses to trigger one of the silicon controlled rectifiers when the other silicon controlled rectifier is conductive. When both silicon controlled rectifiers 33 and 34 are rendered conductive at the same time there is a low impedance between terminals 36 and 37 of the switching regulator shown in FIG. 1. This low impedance could cause a high value of current to flow from terminal 36 through silicon controlled rectifier 33 and windings 28 and 30, through rectifier 34 to terminal 37. This high value of current could cause damage to the silicon controlled rectifiers. The recovery disable circuit 54 prevents both of the silicon controlled rectifiers from being rendered conductive at the same time. This can be seen be referring to waveforms $E_5$ and $E_6$ of FIG. 4. For example, at time $t_4$ the silicon controlled rectifier 34 is rendered conductive by a pulse shown in waveform R. It can be seen in waveform $E_6$ that the transformer 25 is still delivering energy to the output filter capacitors through diode 43 as shown by the positive voltage in waveform $E_6$. As soon as the silicon controlled rectifier 34 is rendered nonconductive the voltage across secondary winding 31 is positive as shown in waveform $E_5$ of FIG. 4. Thus, between time $t_5$ and $t_7$ both of the waveforms $E_5$ and $E_6$ are positive so that the voltages at the lower end of resistors 70 and 71 in the recovery disable circuit 54 of FIG. 2 are positive. The positive voltage at the lower end of resistors 70 and 71 causes transistors 65 and 68 to both be rendered conductive.

When transistor 65 is rendered conductive a current $I_{16}$ flows from terminal 59 through resistor 62 and transistor 65 to ground. Current $I_{16}$ produces a voltage drop of the polarity shown across resistor 62 so that the voltage at the collector of transistor 65 is near ground potential. When transistor 68 is rendered conductive a current $I_{17}$ flows from terminal 60 through resistor 63 to transistor 60 to ground. Current $I_{17}$ provides a voltage drop of the polarity shown across resistor 63 so that the voltage at the collector of transistor 68 is near ground potential. The low voltage at the collector of transistor 65 and the low voltage at the collector of transistor 68 cause a low value of voltage to be coupled through diodes 73 and 74 to the base of transistor 88 in the oscillator 55. Current $I_{10}$ causes transistor 104 in the pulse amplifier to be conductive so that current $I_{11}$ produces a voltage drop across resistor 102. The voltage drop across resistor 102 causes a low value of voltage at the collector of transistor 102. This low value of voltage is coupled through diode 95 to the base of transistor 88. The low value of voltages coupled through diodes 73, 74 and 95 cause transistor 88 to be nonconductive. When transistor 88 is nonconductive the capacitor 91 cannot discharge and cannot produce any pulses which would cause the trigger generator to render the silicon controlled rectifiers in FIG. 1 conductive.

While the principles of the invention have now been made clear in an illustrative embodiment, there will be many obvious modifications of the structure, proportions, materials and components without departing from those principles. The appended claims are intended to cover any such modifications.

What is claimed is:

1. A pulse generator for use with a switching regulator having a pair of silicon controlled rectifiers, a pair of diodes, and first and second transformers each having a primary winding and a secondary winding, said generator comprising:
   a unijunction transistor having an emitter and first and second bases;
   a capacitor, a first plate of said capacitor being connected to said emitter of said unijunction transistor;
   a first resistor;
   first and second reference potentials, said second base of said unijunction transistor being connected to said first potential;
   a signal-input terminal;
   a first diode, said first diode being connected between said input terminal and said first plate of said capacitor;
   a disabling circuit, said disabling circuit being connected between said second potential and said first base of said unijunction transistor, said first resistor being connected between a second plate of said capacitor and said second potential, said disabling circuit being coupled to said regulator, said regulator developing a first signal when both of said diodes in said regulator are conducting, said first signal causing said disabling circuit to have an extremely large value of impedance between said second potential and said unijunction transistor, said regulator developing a second signal when either of said diodes in said regulator is not conducting, said second signal causing said disabling circuit to have a low value of impedance between said second potential and said unijunction transistor;
   a recovery disable circuit, said disable circuit being connected between said input terminal and said second potential, said disable circuit being coupled to said regulator, said regulator providing a signal which causes said disable circuit to have a low impedance between said input terminal and said second potential when either of said rectifiers is conducting, said disable circuit having a large value of impedance when neither of said rectifiers is conducting.

2. A pulse generator as defined in claim 1 wherein:
   said disabling circuit is coupled to said recovery disable circuit, said first signal from said regulator causing said recovery disable circuit to develop a disabling signal which causes said disabling circuit to have an extremely large value of impedance between said second potential and said unijunction transistor, said second signal from said regulator causing said recovery disable circuit to develop an enabling signal which causes said disabling circuit to have a low value of impedance.

3. A pulse generator as defined in claim 1 wherein said recovery disable circuit includes:
   first, second, third and fourth transistors each having a base, a collector and an emitter;
   second, third, fourth and fifth resistors, said second resistor being connected between said first potential and said collector of said first transistor, said third resistor being connected between said first potential and said collector of said second transistor, said emitters of said first and said second transistors being connected to said second potential, said bases of said third and said fourth transistors being connected to said second potential, said emitter of said third transistor being connected to said base of said first transistor, said emitter of said fourth transistor being connected to said base of said second transistor, said collectors of said third and said fourth transistors being connected to said input terminal, said fourth resistor being connected between said base of said first transistor and a first end of said secondary winding of said first transformer, said fifth resistor being connected between said base of said second transistor and a first end of said secondary winding of said second transformer, a second end of each of said secondary windings of said first and said second transformers being connected to said second potential.

4. A pulse generator as defined in claim 3 wherein said disabling circuit includes:
   a fifth transistor having a base, a collector and an emitter, said emitter of said fifth transistor being connected to said second potential, said collector of said fifth transistor being connected to said first base of said unijunction transistor, said base of said fifth transistor being coupled to said collectors of said first and said second transistors.

5. A pulse generator as defined in claim 1 including:
a second diode, said second diode being connected between said first resistor and said second potential; and
an amplifier having an input lead and an output lead, said input lead of said amplifier being connected to the junction point between said second diode and said first resistor, said output lead of said amplifier being connected to said disabling circuit, current through said second diode causing said amplifier to provide a feedback signal to said disabling circuit when said capacitor is discharging, said feedback signal causing said disabling circuit to have a low value of impedance irrespective of any other signals which are coupled to said disabling circuit.

6. A pulse generator as defined in claim 3 including:
a second diode, said second diode being connected between said first resistor and said second potential; and
an amplifier having an input lead and an output lead, said input lead of said amplifier being connected to the junction point between said second diode and said first resistor, said output lead of said amplifier being connected to said disabling circuit, current through said second diode causing said amplifier to provide a feedback signal to said disabling circuit when said capacitor is discharging, said feedback signal causing said disabling circuit to have a low value of impedance irrespective of any other signals which are coupled to said disabling circuit.

7. A pulse generator for use with a switching regulator having first and second transformers each having a primary winding and a secondary winding, said generator comprising:
a unijunction transistor having an emitter and first and second bases;
a capacitor, a first plate of said capacitor being connected to said emitter of said unijunction transistor;
first, second, third, fourth and fifth resistors;
first and second reference potentials, said second base of said unijunction transistor being connected to said first potential;
a signal-input terminal;
first and second diodes, said first diode being connected between said input terminal and said first plate of said capacitor, said first resistor being connected between a second plate of said capacitor and the cathode of said second diode, the anode of said second diode being connected to said second potential;
first, second, third, fourth and fifth transistors each having a base, a collector and an emitter, said second resistor being connected between said first potential and said collector of said first transistor, said second resistor being connected between said first potential and said collector of said second transistor, said emitters of said first and said second transistor being connected to said second potential, said bases of said third and said fourth transistors being connected to said second potential, said emitter of said third transistor being connected to said base of said first transistor, said emitter of said fourth transistor being connected to said base of said second transistor, said fourth resistor being connected between said base of said first transistor and a first end of said secondary winding of said first transformer, said fifth resistor being connected between said base of said second transistor and a first end of said secondary winding of said second transformer, a second end of each of said secondary windings of said first and said second transformers being connected to said second potential, said collectors of said third and said fourth transistors being connected to said input terminal, said collector of said fifth transistor being connected to said first base of said unijunction transistor, said emitter of said fifth transistor being connected to said second potential, said base of said fifth transistor being coupled to said collectors of said first and said second transistors; and
an amplifier having an input lead and an output lead, said input lead of said amplifier being connected to said cathode of said second diode, said output lead of said amplifier being coupled to said base of said fifth transistor.

8. A pulse generator as defined in claim 7 including:
third, fourth and fifth diodes, said third diode being connected between said collector of said first transistor and said base of said fifth transistor, said fourth diode being connected between said collector of said second transistor and said base of said fifth transistor, said fifth diode being connected between said output lead of said amplifier and said base of said fifth transistor.

9. A pulse generator as defined in claim 8 wherein said amplifier includes:
a sixth transistor having a base, a collector and an emitter, said emitter of said sixth transistor being connected to said second potential, said base of said sixth transistor being connected to said input lead of said amplifier, said collector of said sixth transistor being connected to said output lead of said amplifier; and
sixth and seventh resistors, said sixth resistor being connected between said first potential and said base of said sixth transistor, said seventh resistor being connected between said first potential and said collector of said sixth transistor.

* * * * *